United States Patent
Kogan et al.

(10) Patent No.: US 12,487,727 B2
(45) Date of Patent: Dec. 2, 2025

(54) SENSORY ADJUSTMENT MECHANISM

(71) Applicant: Microsoft Technology Licensing, LLC, Redmond, WA (US)

(72) Inventors: Lily Kogan, Sammamish, WA (US); David Kogan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 577 days.

(21) Appl. No.: 16/817,836

(22) Filed: Mar. 13, 2020

(65) Prior Publication Data

US 2021/0286500 A1 Sep. 16, 2021

(51) Int. Cl.
| | |
|---|---|
| G06F 3/04812 | (2022.01) |
| G06F 3/0481 | (2022.01) |
| G06F 3/0482 | (2013.01) |
| G06F 3/0484 | (2022.01) |
| G06F 3/04847 | (2022.01) |
| H04M 1/72448 | (2021.01) |

(52) U.S. Cl.
CPC ........ *G06F 3/04812* (2013.01); *G06F 3/0481* (2013.01); *G06F 3/0482* (2013.01); *G06F 3/0484* (2013.01); *G06F 3/04847* (2013.01); *H04M 1/72448* (2021.01)

(58) Field of Classification Search
CPC ............ H04N 1/00501; H04N 1/00509; G06F 3/0481; G06F 3/04812; G06F 3/0482; G06F 3/0484; G06F 3/04847; H04M 1/72448
See application file for complete search history.

(56) References Cited

U.S. PATENT DOCUMENTS

| | | | |
|---|---|---|---|
| 6,057,836 A * | 5/2000 | Kavalam | G06F 3/0481 715/779 |
| 7,765,496 B2 | 7/2010 | Bernstein | |
| 7,784,031 B1 * | 8/2010 | Borg | G06F 9/44505 717/121 |
| 8,239,768 B2 | 8/2012 | Sokol et al. | |
| 9,785,336 B2 | 10/2017 | Summer et al. | |

(Continued)

FOREIGN PATENT DOCUMENTS

| | | |
|---|---|---|
| DE | 102016117428 A1 | 3/2017 |
| WO | 2017046610 A1 | 3/2017 |

OTHER PUBLICATIONS

Pavlov, Nikolay, "User Interface for People with Autism Spectrum Disorders", In Journal of Software Engineering and Applications, vol. 7, Feb. 11, 2014, pp. 128-134.

(Continued)

*Primary Examiner* — Kieu D Vu
*Assistant Examiner* — Blaine T Basom
(74) *Attorney, Agent, or Firm* — Schwegman Lundberg & Woessner, P.A.

(57) ABSTRACT

A computer implemented method detects adjustments to sensory parameters in one or more applications. The computer implemented method, counts the adjusted number of sensory parameters and compares the number of adjustments, to a threshold number of sensory parameters adjusted. If the number of adjustments meet the threshold, a user receives a prompt to select a set of preconfigured sensory parameter adjustments. The selected set of preconfigured sensory parameter adjustments is applied to at least one of the or more applications.

18 Claims, 9 Drawing Sheets

(56) References Cited

U.S. PATENT DOCUMENTS

| | | | |
|---|---|---|---|
| 2002/0152255 A1* | 10/2002 | Smith, Jr. | G06F 9/451 |
| | | | 718/102 |
| 2004/0218451 A1* | 11/2004 | Said | G06F 3/0481 |
| | | | 365/222 |
| 2004/0268360 A1* | 12/2004 | Atkin | G06F 16/957 |
| | | | 719/310 |
| 2006/0139312 A1 | 6/2006 | Sinclair et al. | |
| 2007/0130506 A1* | 6/2007 | Danninger | G06F 40/274 |
| | | | 715/224 |
| 2013/0212484 A1* | 8/2013 | Joshi | G06F 3/04842 |
| | | | 715/740 |
| 2013/0307801 A1 | 11/2013 | Nam | |
| 2014/0325360 A1 | 10/2014 | Jung et al. | |
| 2015/0095835 A1* | 4/2015 | Mantha | H04L 67/10 |
| | | | 715/776 |
| 2016/0085921 A1 | 3/2016 | Farrell et al. | |
| 2017/0177200 A1 | 6/2017 | Jeong et al. | |
| 2017/0357627 A1* | 12/2017 | Peterson | G06F 40/14 |
| 2020/0356656 A1* | 11/2020 | Chhabra | G06F 21/44 |
| 2021/0043109 A1* | 2/2021 | Mese | G09B 21/006 |

OTHER PUBLICATIONS

"International Search Report and Written Opinion Issued in PCT Application No. PCT/US21/015139", Mailed Date: May 20, 2021, 14 Pages.

* cited by examiner

SENSORY ADJUSTMENT MECHANISM

BACKGROUND

Some users of devices may be sensitive to varying levels of sensory input, making it difficult for them to use such devices. A user with a development disorder, like Autism, may have difficulty managing their sensory input. Such users may be overwhelmed by sounds, lights or other types of sensory input. For example, a person may be sensitive to light, sound, or other sensations. Some users may be inundated with colored animated images or spontaneous alerts on an application. Many different software applications may provide varying levels of sensory input to such users that are a distraction and may result in an unfavorable user experience.

To minimize or eliminate the distractions, some applications allow a user to adjust certain settings to address a sensitivity. The settings may provide the ability to pause animated images, disable sound reminders, create a single-line ribbon pane, or disable message preview in a message list.

SUMMARY

A computer implemented method detects adjustments to sensory parameters in one or more applications. The method counts and compares the number of adjustments, to a threshold number of sensory parameter adjustments. If the number of adjustments meet or exceed the threshold number of sensory parameter adjustments, a user receives a prompt, to select a parameter adjustment set. The parameter adjustment set is selected and applied to at least one of the one or more applications.

DETAILED DESCRIPTION

Figure 1:
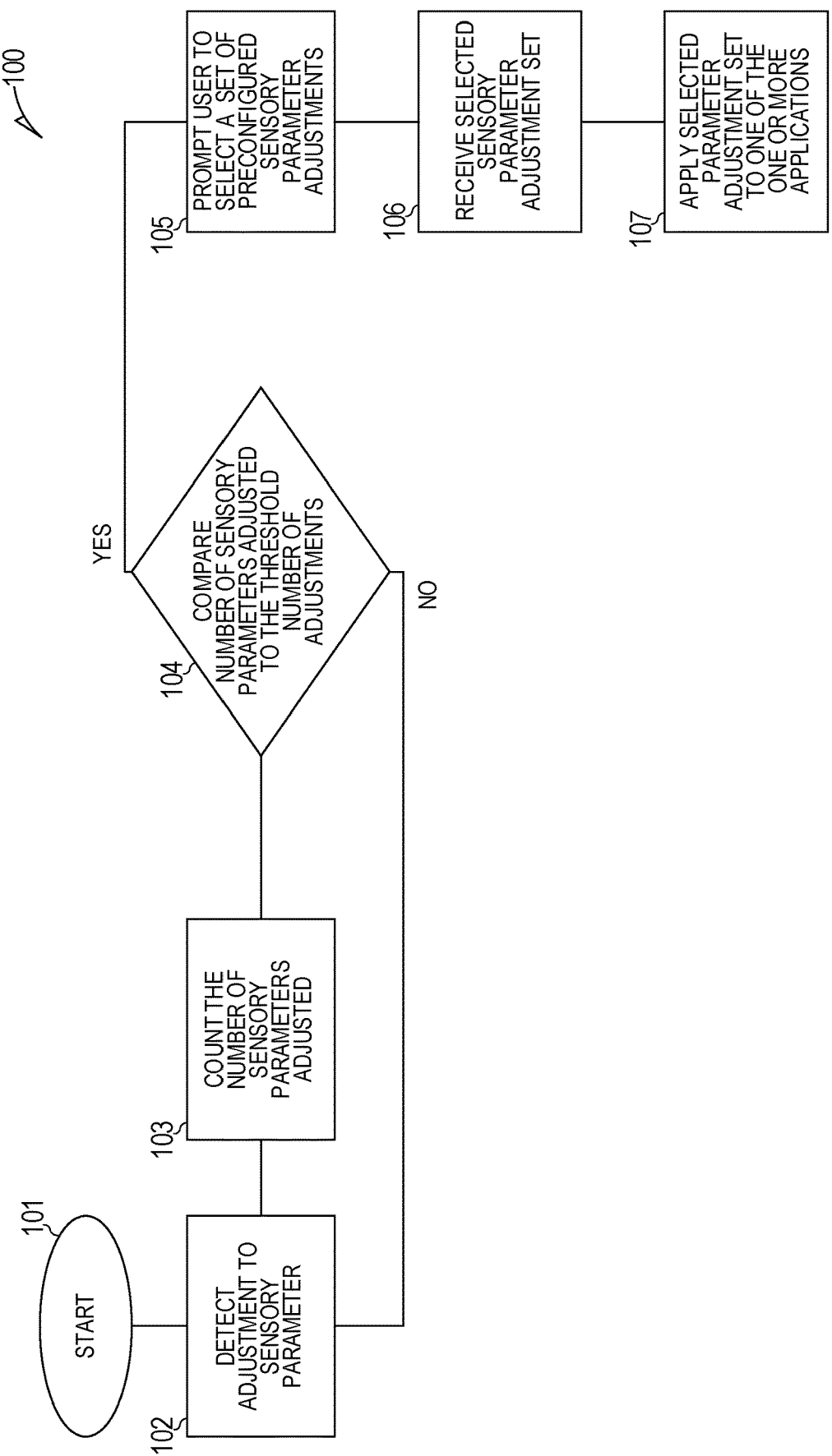
FIG. 1 is a flowchart illustrating a computer implemented method of applying a set of preconfigured sensory parameter adjustments, according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

FIG. 1 is a flowchart illustrating a computer implemented method 100 of applying a set of preconfigured sensory parameter adjustments in response to a user changing a threshold number of parameters.

In general, method 100 detects an adjustment to a sensory parameter. A user with specific sensory sensitivities may wish to adjust a plurality of sensory parameters to apply to one or more applications. Each modification of the value of a sensory parameter by the user is counted as one adjustment to a sensory parameter. Sensory parameters may be adjusted, for example, to disable sound, increase an icon and text size, or adjust a toolbar pane to a single ribbon pane etc. The adjustment by a user of one or more values of sensory parameters may be representative of the specific sensory sensitivities of the user. In other words, a sensory parameter is a parameter that affects how a user interface is sensed by the user.

Method 100 starts at operation 101. At operation 102, method 100, detects an adjustment to a sensory parameter in an application, such as an adjustment to disable sound. The adjusted sensory parameter may be applied to an application to disable sound reminders for messages generated by the application. In addition to disabling sound, at operation 102 an application may detect many other sensory parameter adjustments, such as an adjustment to increase an icon and text size, to adjust toolbar pane, or to change other sensory parameters.

At operation 103, method 100, counts the number of sensory parameter adjustments made at operation 102. The count represents the number of sensory parameters adjustments that may have been made for one or more applications running on a computer system, such as gaming programs, mobile apps, operating systems, devices, or other programs, apps, and applications.

At operation 104, method 100, compares the number of counted adjustments to a threshold number of adjustments. The threshold number of adjustments may be chosen by an administrator or may be an arbitrary number set by a user. The threshold may be greater than or equal to 1 in different embodiments. At operation 104, if the comparison indicates that the threshold number has not been met, method 100 returns to operation 102 to continue counting.

In one example, a user may set the threshold number to 2. After the detection of the adjusted sensory parameters, at operation 102, method 100 will determine if the number, N, of counted sensory parameter adjustments, at operation 103 met the threshold number (N≥2) at operation 104. If the threshold number of adjustments is not met, the system will revert to detection of adjustments to sensory parameters, at operation 102.

If, the threshold number of adjustments is met at operation 104, a user will receive a prompt to select a set of preconfigured sensory parameter adjustments, at operation 105. The preconfigured sensory parameter adjustment sets may be identified by different names, titles, or symbols.

For example, a set of preconfigured sensory parameter adjustments may be identified as "Moderate." After the preconfigured sensory parameter adjustment set "Moderate" is selected by the user, at operation 105, the selection will be forwarded to operation 106. At operation 106, the preconfigured sensory parameter adjustment set "Moderate" is received. The preconfigured sensory parameter adjustment set is applied to one or more applications at operation 107. The applications may include but are not limited to desktop applications, gaming programs, operating systems, mobile apps, or other technologies. The user may be prompted to indicate whether to apply the selected parameter adjustment set just to the application in which adjustments were detected, or to also apply the selected parameter set to all or other selected applications.

Figure 2:
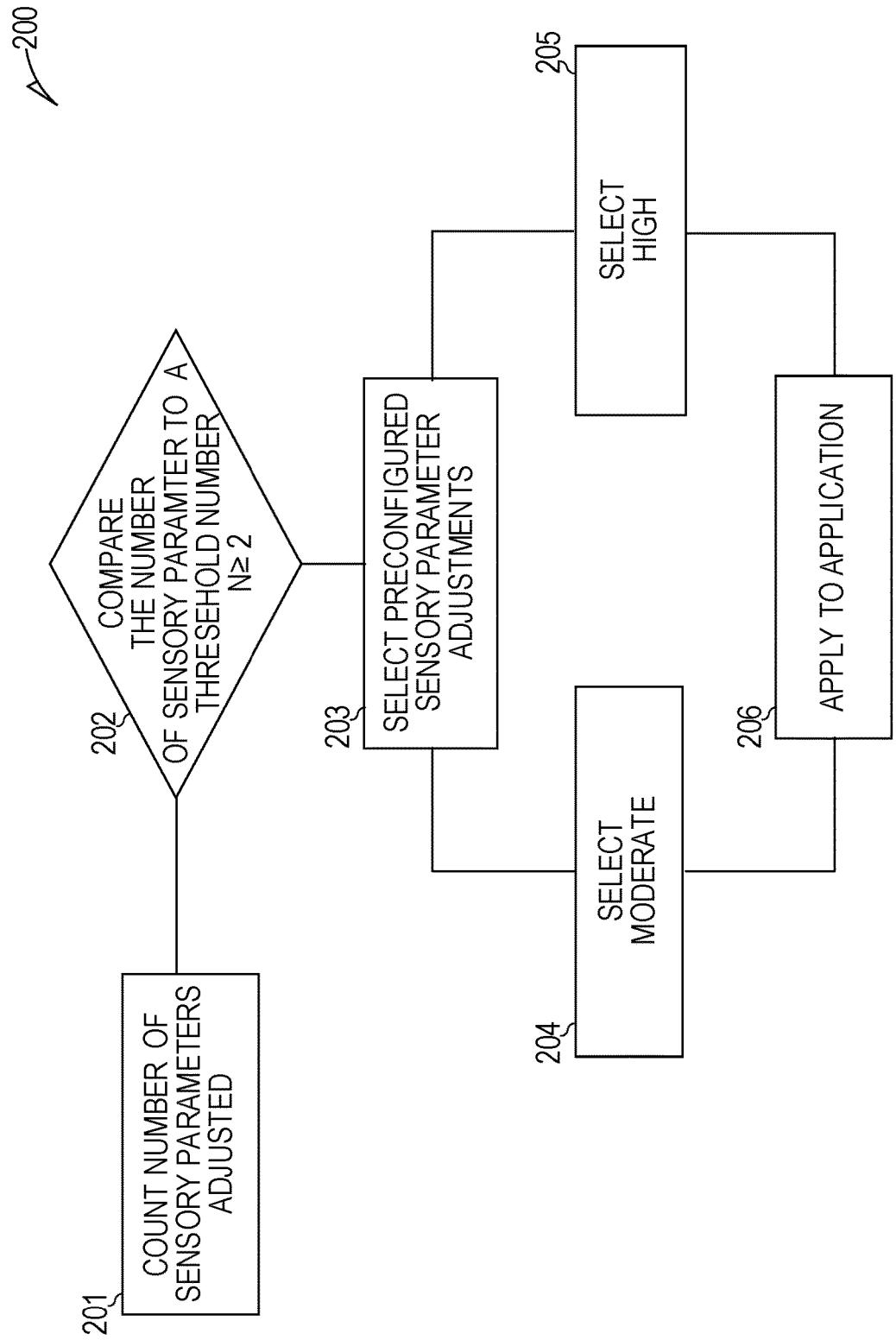
FIG. 2 is a flowchart illustrating a computer implement method of applying preconfigured sensory parameter adjustment sets to an application, according to an example embodiment.

FIG. 2 is a flow chart illustrating a computer implemented method 200 of applying preconfigured sensory parameter adjustment sets to an application. Method 200 begins at operation 201. A count, N, of the number of sensory parameters adjusted is compared to the threshold number of greater than or equal to 2, at operation 202. When the threshold number 2 is met or exceeded, at operation 202, the user will receive a prompt to select a set of preconfigured sensory parameters, at operation 203. The user selection of "Moderate" or "High" will result in either operations 204 or 205 respectively being performed to receive the associated parameter adjustments. At operation 206, method 200, uses the received associated set of preconfigured sensory parameter adjustments of "Moderate" or "High" to perform corresponding adjustments to one or more applications, apps, programs, etc.

Figure 3:
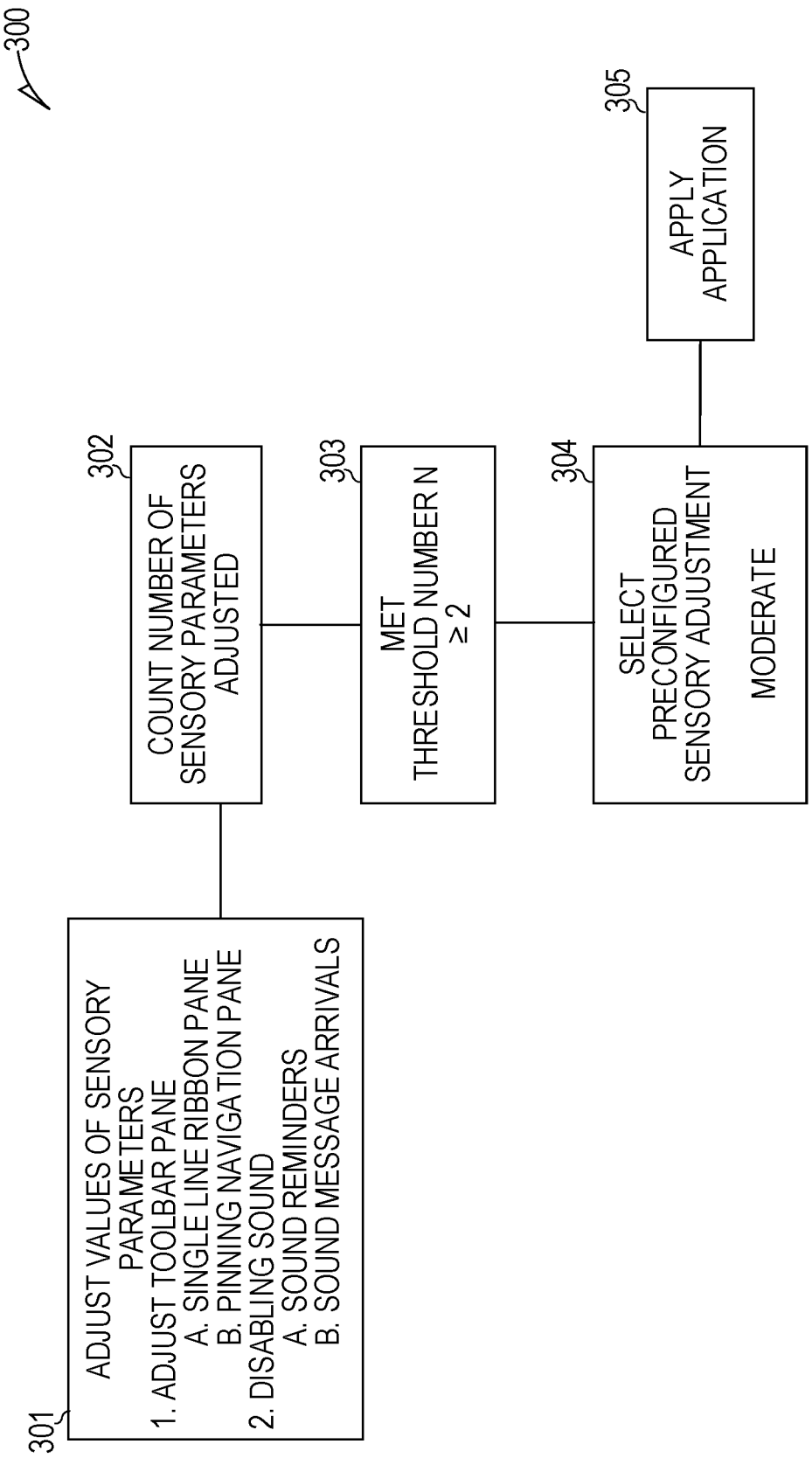
FIG. 3 is a flowchart illustrating a computer implemented method of applying a set of "Moderate" preconfigured sensory parameter adjustments, according to an example embodiment.

FIG. 3 is flowchart illustrating a computer implemented method 300 of selecting a preconfigured sensory parameter adjustment set, "Moderate." Method 300 begins, at operation 301. Operation 301 provides a mechanism to allow users to adjust one or more sensory parameters. Operation 301 may receive user input to adjust a tool bar pane and sound. The adjustment to the tool bar pane, may include adjusted values enabling a simplified (single line) ribbon or pining the navigation pane by default. The adjustment to sound may include disabling sound reminders or message arrival alerts.

In addition to adjusting the toolbar pane and disabling sound, other parameters that may be adjusted include, but are not limited to, turning off at message preview, providing wider spacing in the message list, pausing animated gifs (graphic interchange formats), turning off a reminder sound, disabling sound on message arrival, disabling desktop alerts when messages arrive, turn off people pane, and turn off a to-do bar. The type of sensory parameters available for adjustment may different for different software, such as gaming apps, operating systems, mobile apps, other apps, or applications. While operation 301 illustrates adjustment of the toolbar pane and sound, the actual user interfaces for each adjustment, as well as other potential adjustments may be scattered and difficult to find in the application. Other applications may have similar adjustments that are also difficult to find.

The adjustments are counted, at operation 302 and compared to the threshold number of greater than or equal to 2, at operation 303. The preconfigured sensory parameter adjustment set, "Moderate," at operation 304, is applied to the application, at operation 305.

The sensory adjustments for a preconfigured sensory parameter adjustment set, "Moderate" may include sensory parameters specifically for users having moderate sensory sensitivities. For example, the sensory parameter adjustment, tool bar pane, adjusting a simplified single line ribbon, may only be included in only the moderate set of the adjustment sets, while the sensory parameter adjustment to sound that disables sound reminders may be included in more than one preconfigured sensory parameter adjustment set for users with different sensory sensitivities.

Figure 4:
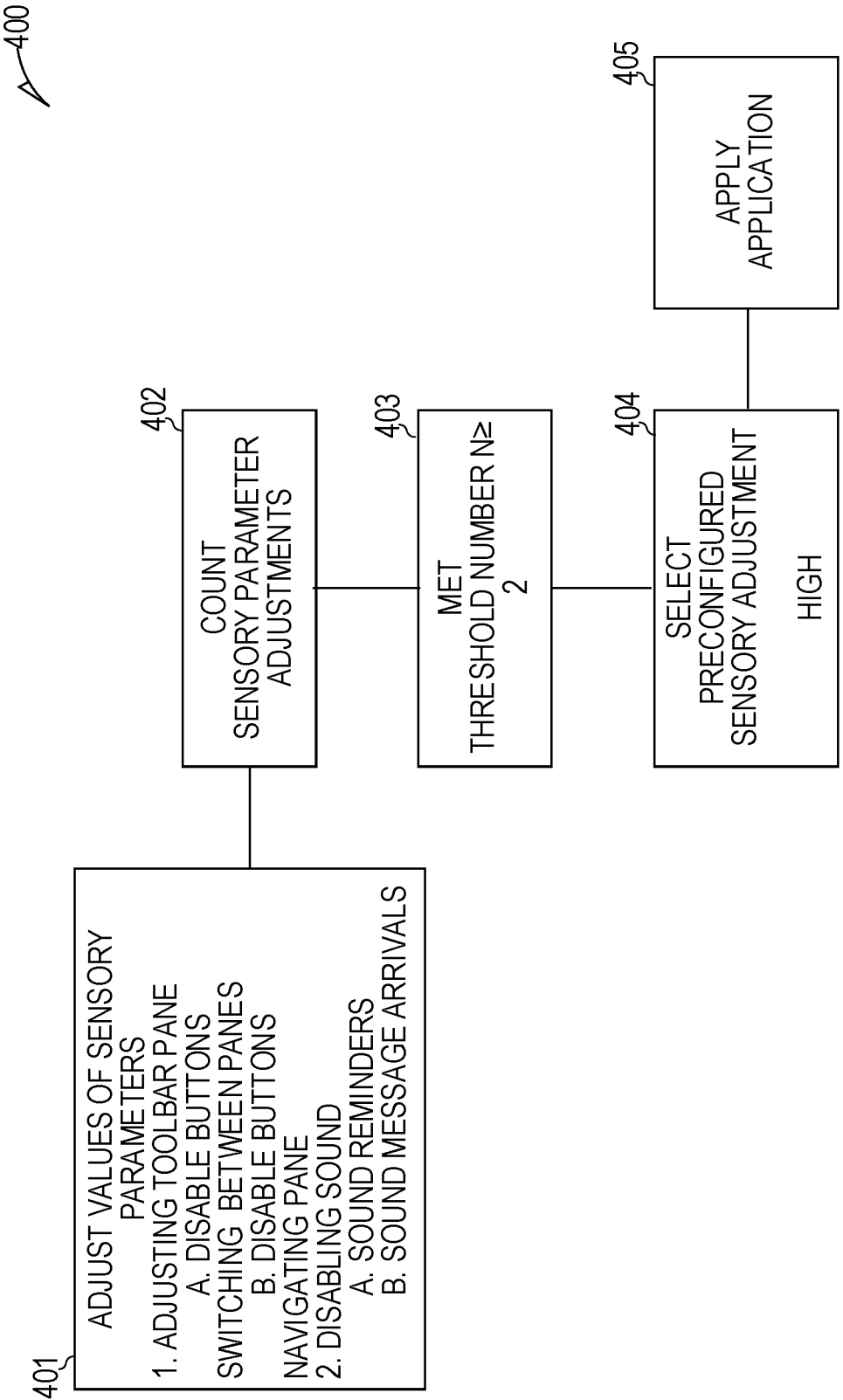
FIG. 4 is a flowchart illustrating a computer implemented method of applying a set of "High" preconfigured sensory parameter adjustments, according to an example embodiment.

FIG. 4 is a flowchart illustrating a computer implemented method 400, of selecting a preconfigured sensory adjustment set, "High." Method 400 begins, at operation 401. Operation 401 provides a mechanism to allow user to adjust one or more sensory parameters. Operation 401 may receive user input to adjust a toolbar pane and sound. The adjustment to sensory parameters, tool bar pane and sound may include adjusted values to disabling the button to switch between simplified and classic ribbon or minimizing and maximizing the navigation pane. The adjustment to sound may include disabling sound reminders or message arrival alerts.

In addition to adjusting the toolbar pane and disabling sound, other parameters that may be adjusted include, but are not limited to, turning off at message preview, providing wider spacing in the message list, pausing animated gifs (graphic interchange formats), turning off a reminder sound, disabling sound on message arrival, disabling desktop alerts when messages arrive, turn off people pane, and turn off a to-do bar. Further sensory parameters available for adjustment, may be different for various gaming apps, operating systems, mobile apps, other apps, or applications. While operation 401 illustrates adjustment of the toolbar pane and sound, the actual user interfaces for each adjustment, as well as other potential adjustments may be scattered and difficult to find in the application. Other applications may have similar adjustments that may require effort to find.

The number of adjustments, N, are counted at operation 402 and compared to the threshold number of greater than or equal to 2, at operation 403. The preconfigured sensory parameter adjustment set, "High," at operation 404 is applied to the application, at operation 405.

The sensory adjustments for the preconfigured sensory parameter adjustment set, "High" may include sensory parameters specifically for a highly sensitive user as well as sensory parameter adjustments that may be included in other preconfigured sensory parameter adjustment sets. For example, the sensory parameter adjustment, tool bar pane, adjusting disable buttons switching between panes, may be included only in the "High" set. The sensory parameter adjustment, sound, may be included in one or more other sensory parameter adjustment sets.

Figure 5:
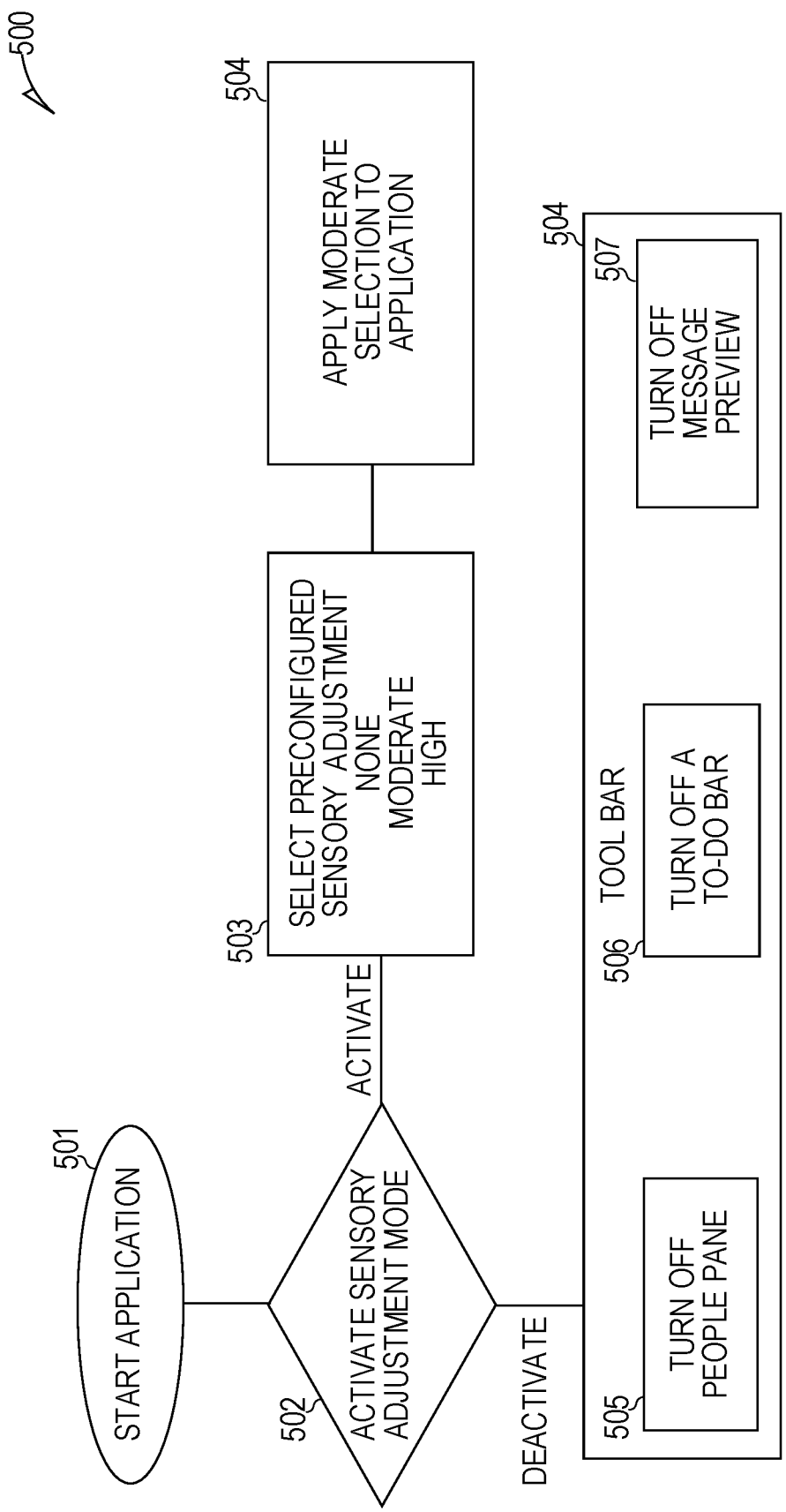
FIG. 5 is a flow chart illustrating a computer implemented method of activating a sensory adjustment mode in an application.

FIG. 5 is a flow chart illustrating a computer implemented method 500 of activating the sensory adjustment mode in an application. Method 500 begins, at operation 501. At decision operation 502, a user has two options-activate or deactivate the sensory adjustment mode. In response to "activate" being selected, at operation 503, the user may, select the preconfigured sensory parameter adjustment set, "None," "Moderate," or "High." The selection is received, and the selected preconfigured parameter set is applied to an application, at operation 504.

A second option "deactivate" selected at operation 502 results in operation 504 deactivating the sensory adjustment mode and adjusting the sensory parameters in an application back to default values, or previously selected values. For example, a user may now adjust one or more sensory parameters, at operation 505 related to, "Turning off People Pane," at operation 506 for "Turning Off to Do Bar," or at operation 507 for, "Turning off Message Pane," within the toolbar of an application, gaming apps, or other apps. After a user adjusts parameters at operation 504, no parameter sets will be offered to the user since deactivate was selected at operation 502. In a further embodiment, decision operation 502 may be used to indicate that a user wishes to implement one of the sets without turning off the prompting based on the number of parameters manually adjusted by the user during operation 504. In that case, once the threshold is reached in operation 504, the remaining steps for selecting and applying a preconfigured sensory parameter adjustment set will follow method 300 or 400, as shown in FIGS. 3 and 4.

Figure 6:
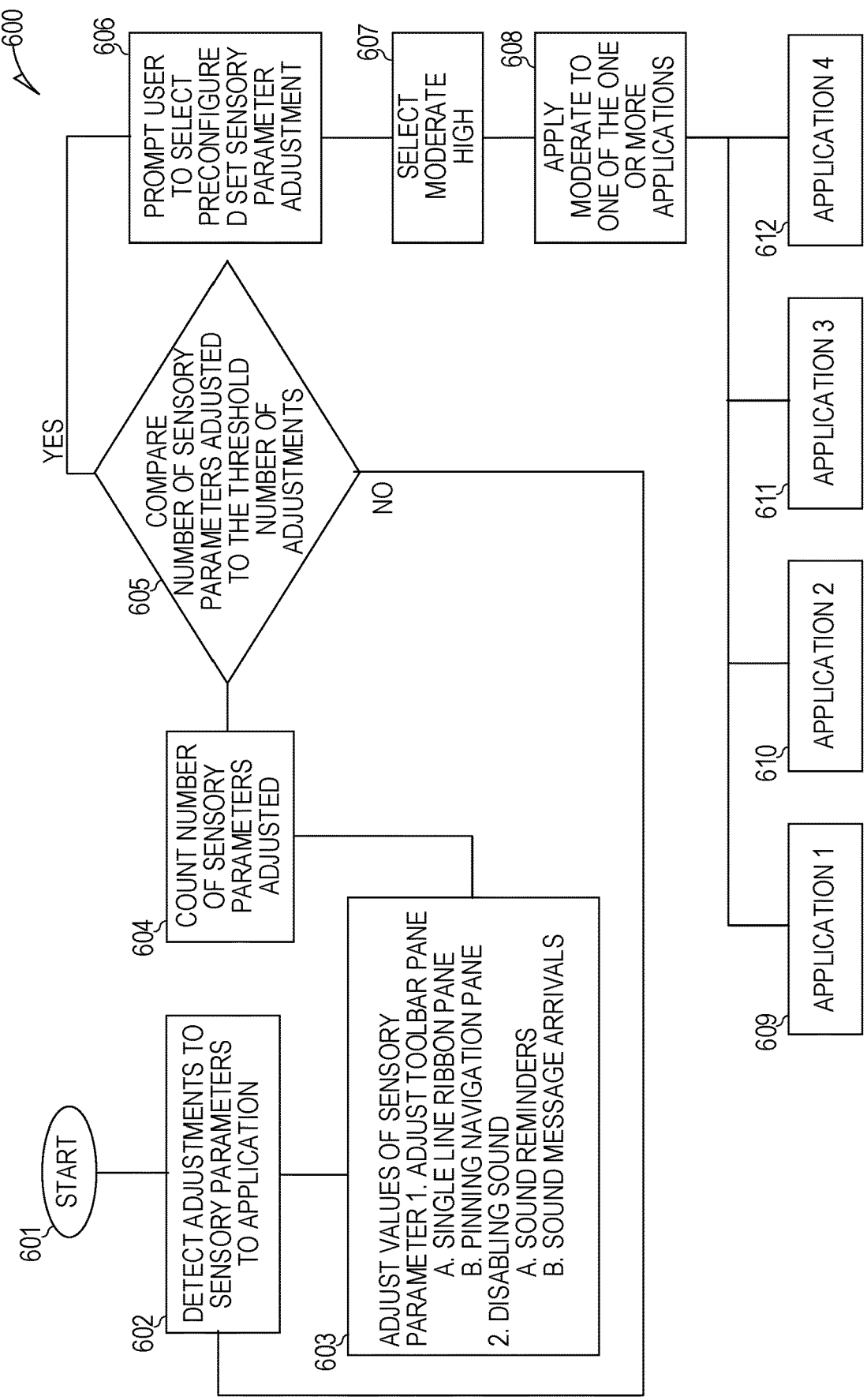
FIG. 6 is a flowchart illustrating a computer implemented method of applying a set of preconfigured sensory parameter adjustments to one or more applications, according to an example embodiment.

FIG. 6 is a flow chart illustrating a computer implemented method 600 of applying selected preconfigured sensory adjustment sets to multiple applications. Method 600 begins, at operation 601. An adjustment to sensory parameters, tool bar pane and sound is detected, at operation 602. The adjustment to the tool bar pane, may include adjusted values enabling a single line ribbon or pining the navigation pane by default as represented at 603. The adjustment to sound may include disabling sound reminders or message arrival alerts. The number, N, of adjustments of the sensory parameters are counted, at operation 604.

At decision operation 605, method 600, compares the number of counted adjustments to a threshold number of adjustments to parameters. The threshold number at operation 605, may be selected based on the number of sensory parameters within an application or an arbitrary number set by a user. If the threshold number of adjustments is not met; the user may continue to adjust sensory parameters at operation 602, until the threshold number is met, at operation 605. If the threshold number of adjustments is met, a user will receive a prompt, at operation 606 to select a set. At operation 607, method 600, receives a selected preconfigured sensory parameter adjustment set, and applies the set to one or more applications at operation 608.

For example, a user may select a preconfigured sensory parameter adjustment set, "Moderate," at operation 608, and apply the "Moderate" setting to applications at operation 609, 610, 611, or 612.

In some examples, different applications may use different nomenclature for similar types of settings. For example, a sound setting may be referred to as an audio setting in two different application. The parameters for disabling sound may be "disable" in one, and "mute" in the other. Operation 608 may contain translation functions or tables to translate the selected set into the correct format for each different application in order to enable the selected set parameters to be properly applied to achieve the desired goal of reducing sensor input according to the level of the set selected. By mapping the selected set to each application, the user is spared from having to individually modify each of multiple applications to achieve the desired sensor input level.

In one example, a canonical table of sensory parameter adjustments may be used. Each developer of various applications may map their sensor adjustment parameters to the table. As each adjustment is made by a user, regardless of the application in which the adjustment, the adjustment will be translated to the canonical table of adjustments. Such translation allows each application to use the table to consistently adjust their parameters based on the selected set.

Figure 7:
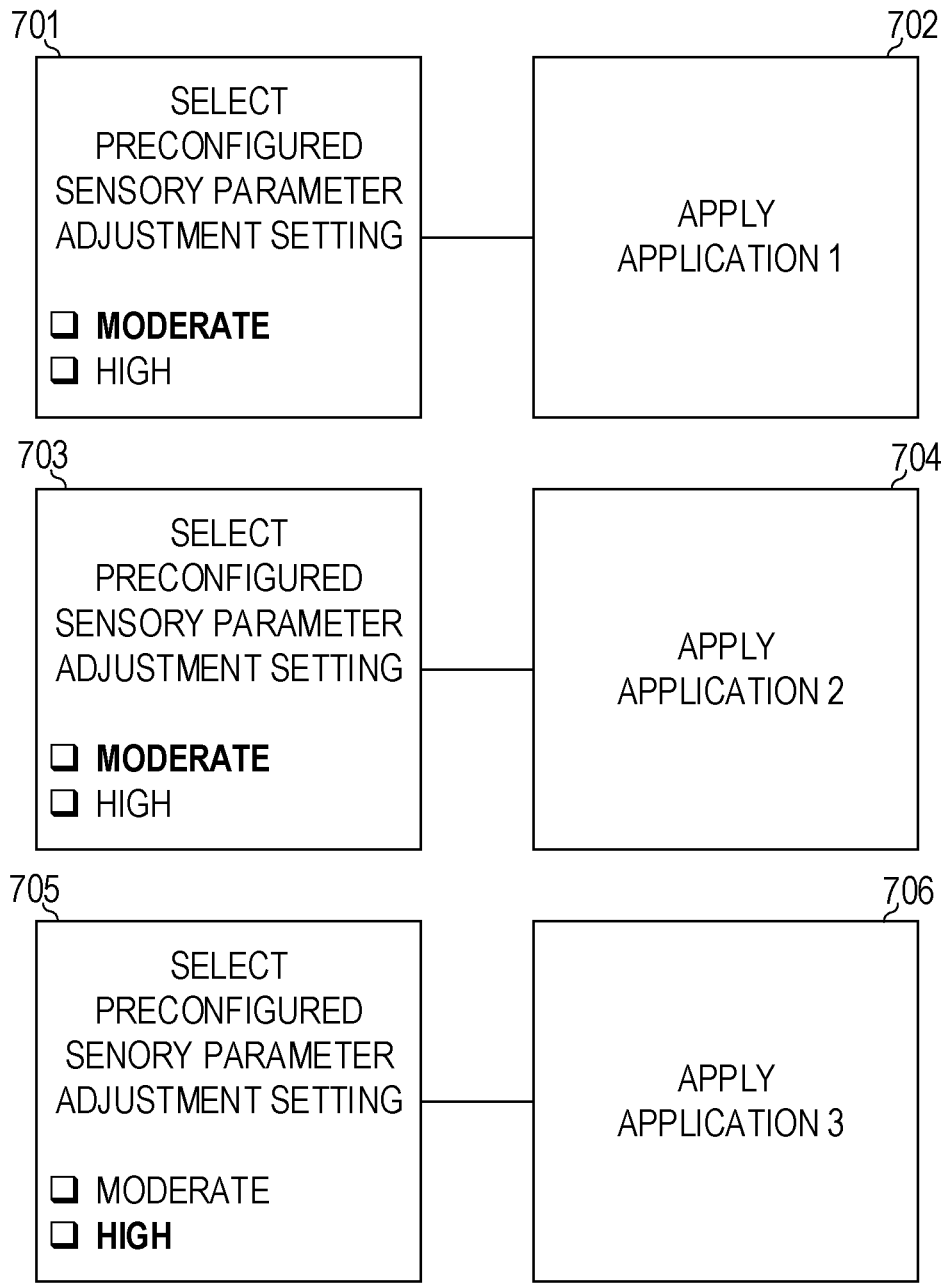
FIG. 7 is a diagram of a user interface illustrating a computer implemented method of selecting a set of preconfigured sensory parameters for an application, according to an example embodiment.

FIG. 7 is a diagram of a user interface, illustrating a computer implemented, method 700 applying a severity of preconfigured sensory adjustment sets to individual applications. At operation 701, method 700, preconfigured sensory parameter adjustment sets, "Moderate," or "High" are applied to one or more applications. For example, a user may select a set, "Moderate" and apply the preconfigured sensory adjustment settings in the set to Application 1, at 701. Likewise, at operation 703, a preconfigured sensory parameter adjustment set, "Moderate" is selected and applied to Application 2, at operation 704.

A user may opt to individually select a set of "High" to apply the "High" adjustments to one or more applications. At operation 705, method 700, a preconfigured sensory parameter adjustment set, "High," is applied to Application 3, at operation 706. In further embodiments, a selection of sensory parameter adjustments could apply to all applications in a user interface.

Figure 8:
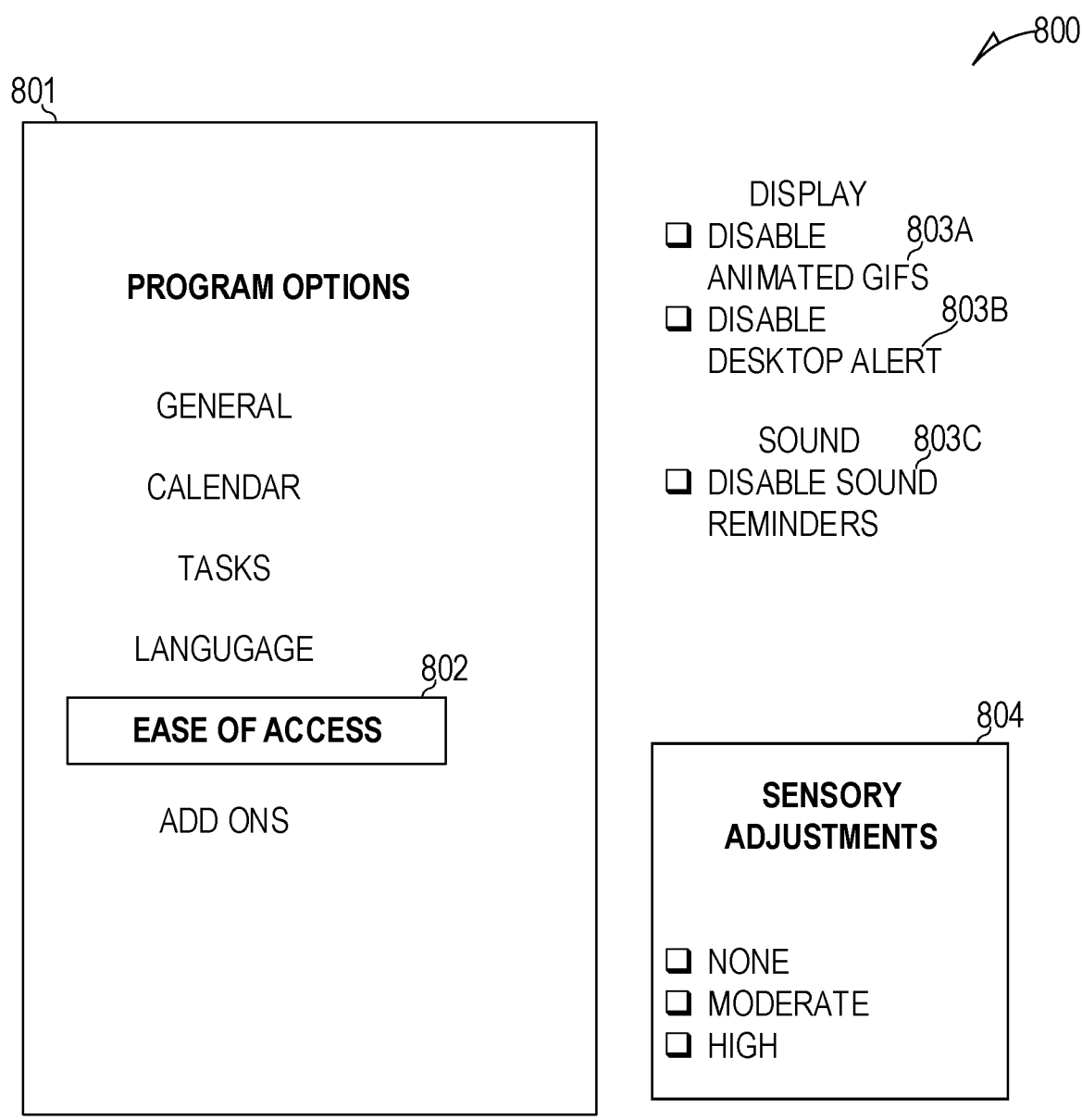
FIG. 8 is a screenshot of a user interface, displaying an "Ease of Access" option located in the Program Option of an application, according to an example embodiment.

FIG. 8 is a block representation of a user interface, displaying an "Ease of Access" option located in a Program Option of an application. The user interface 800 displays a view of the Program Options available in an application. Program Options 801, in user interface 800, allows a user to customize options for an application. For example, a user may customize an application like Outlook with Options, such as, "General," "Calendar," "Tasks," "Language," "Ease of Access," and "Add Ons." The list of Program Options for an application, like Outlook, is not limited to the list shown in user interface 800.

The "Ease of Access" option 802, displays a sub portion of a user interface 800, where different sensory parameters may be adjusted individually. Sensory parameters 803A-C, display adjustment options for individual sensory parameters. For example, an adjustment to disable animated gifs at 803A via a checkbox may be used by a user who is sensitive to motion. An adjustment to disable a desktop alert at 803B may be selected via a check box by a user who has a sensitivity to alerts. Likewise, a user may have a sensitivity to sound 803C and selects disable sound reminders via a corresponding checkbox. The individual sensory parameters, 803A-C, is not limited to the number of sensory parameters in the "Ease of Access" display. The sub portion of user interface 800 may be used to aggregate sensory parameter settings that may be selected to accommodate sensory sensitivities of a user for the particular application. While three settings are shown, there may be more or fewer settings in further embodiments.

A sensory adjustment panel 804 has a list of preconfigured sensory parameter adjustment sets, "None," "Moderate," and "High" from which to select via checkbox or other user interface mechanism facilitating selection. The sensory adjustment panel 804 may override individual settings and apply the preconfigured sensory adjustment set selected. For example, a user may select individual sensory parameters to disable sound and animated GIFs. After the sensory parameters are adjusted, the user may decide to apply a preconfigured sensory adjustment set, "Moderate," to an application. The "Moderate" setting overrides the two previous selections and the preconfigured sensory parameter adjustment is applied. The selection of "none" may result in no settings being changed or may be used to reset the settings to default values.

Figure 9:
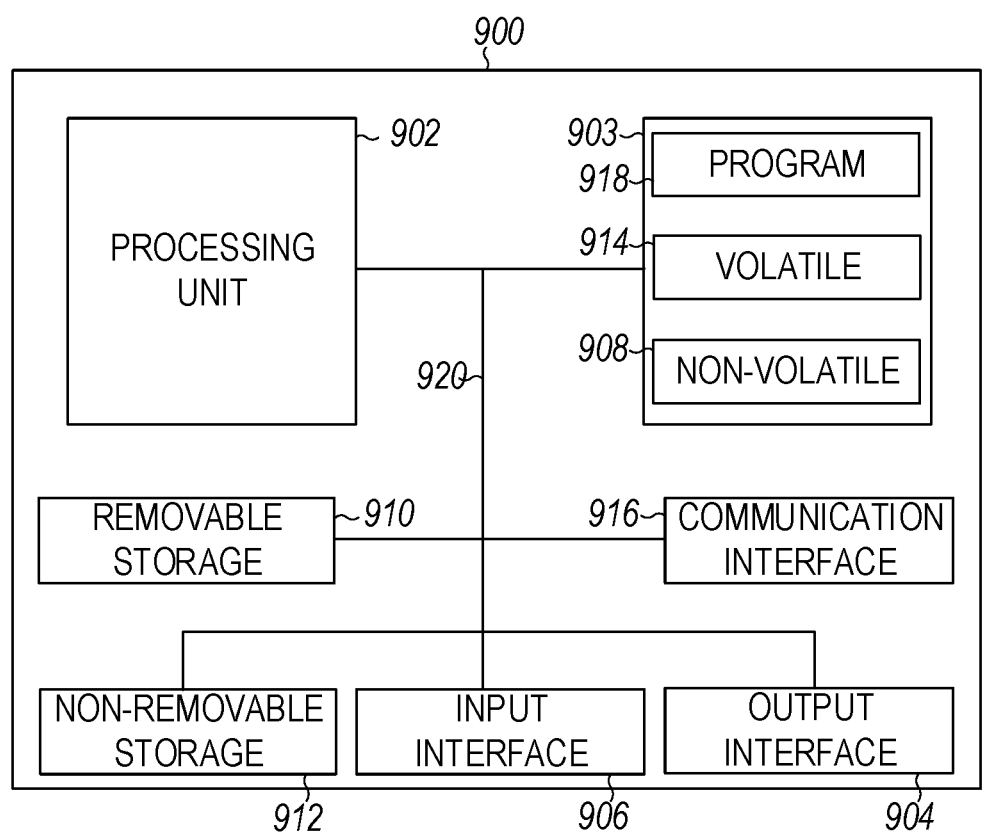
FIG. 9 is a block schematic diagram of a computer system to implement the use of sensory parameter adjustment sets according to an example embodiment.

FIG. 9 is a block schematic diagram of a computer system to implement the use of sensory parameter adjustment sets and for performing methods and algorithms according to example embodiments. All components need not be used in various embodiments.

One example computing device in the form of a computer 900 may include a processing unit 902, memory 903, removable storage 910, and non-removable storage 912. Although the example computing device is illustrated and described as computer 900, the computing device may be in different forms in different embodiments. For example, the computing device may instead be a smartphone, a tablet, smartwatch, smart storage device (SSD), or other computing device including the same or similar elements as illustrated and described with regard to FIG. 9. Devices, such as smartphones, tablets, and smartwatches, are generally collectively referred to as mobile devices or user equipment.

Although the various data storage elements are illustrated as part of the computer 900, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 903 may include volatile memory 914 and non-volatile memory 908. Computer 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 900 may include or have access to a computing environment that includes input interface 906, output interface 904, and a communication interface 916. Output interface 904 may include a display device, such as a touchscreen, that also may serve as an input device. The input interface 906 may include one or more of a touchscreen, touchpad, mouse, keyboard, camera, one or more device-specific buttons, one or more sensors integrated within or coupled via wired or wireless data connections to the computer 900, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 900 are connected with a system bus 920.

Computer-readable instructions stored on a computer-readable medium are executable by the processing unit 902 of the computer 900, such as a program 918. The program 918 in some embodiments comprises software to apply sensor parameter adjustment sets to provide a better user interface experience for users who may be sensitive to environmental stimuli. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 918 along with the workspace manager 922 may be used to cause processing unit 902 to perform one or more methods or algorithms described herein.

EXAMPLES

1. A computer implemented method includes detecting sensory parameter adjustments to one or more applications, counting the detected sensory parameter adjustments, comparing the number of counted sensory parameter adjustments to a threshold number of sensory parameter adjustments, prompting a user to select a parameter adjustment set from multiple sets of preconfigured sensory parameter adjustments, in response to the number of counted sensory parameter adjustments exceeding the threshold number, receiving the selected parameter adjustment set, and applying the selected parameter adjustment set to at least one of the one or more applications.

2. The method of example 1, wherein the threshold number of sensory parameter adjustments is two.

3. The method of any of examples 1-2, wherein the multiple sets of preconfigured parameter adjustments correspond to moderate or high user sensory sensitivities.

4. The method of example 3, wherein the selected parameter adjustment set is applied to multiple applications.

5. The method of example 4, wherein each application translates adjustments in the selected parameter adjustment set to application specific adjustments, and wherein applying the selected parameter set comprises applying the application specific adjustments in each application.

6. The method of any of examples 3-5, wherein applying the selected parameter adjustment set of "Moderate" comprises adjusting a toolbar pane to a single line ribbon pane and pinning a navigation pane to the application.

7. The method of any of examples 3-6, wherein applying the selected parameter adjustment set of "High" comprises adjusting a toolbar pane to disable buttons of switching between ribbon panes and to disable buttons of minimizing or maximizing and navigation pane of the application.

8. The method of any of examples 3-7, wherein applying the selected parameter adjustment set of "Moderate" or "High" comprises adjusting a toolbar pane to remove the message preview, widening the message list, pausing animated gifs, disabling people pane, and disabling the to-do bar pane to the application.

9. The method of any of examples 3-8, wherein applying the selected parameter adjustment set of "Moderate" or "High" comprises disabling sound reminders, sound message arrival alerts, and desktop alerts for messages to the application.

10. The method of any of examples 3-9, wherein applying the selected parameter adjustment set of "Moderate" or "High" comprises adding a light option to the reading pane to show the sensory adjustments parameters applied to the application.

11. The method of any of examples 3-10, wherein applying the selected parameter adjustment set of "Moderate" or "High" comprises adding sliding scale control for sensory adjustment applied to application.

12. The method of any of examples 3-11, wherein applying the selected parameter adjustment set of "Moderate" or "High" comprises increasing size of the ribbon and icons and labels to the application.

13. The method of any of examples 1-12, and further including prompting the user to apply the selected parameter adjustment set to an additional application, receiving a user input indicating application to of the selected parameter adjustment set to the additional application, and applying the selected parameter adjustment set to the additional application.

14. A computer readable storage device has instructions stored thereon for causing a computer to perform operations. The operations include detecting sensory parameter adjustments to one or more applications, counting the detected sensory parameter adjustments, comparing the number of counted sensory parameter adjustments to a threshold number of sensory parameter adjustments, prompting a user to select a parameter adjustment set from multiple sets of preconfigured sensory parameter adjustments, in response to the number of counted sensory parameter adjustments exceeding the threshold number, receiving the selected parameter adjustment set, and applying the selected parameter adjustment set to at least one of the one or more applications.

15. The device of example 14, wherein the threshold number of sensory parameter adjustments is two and the multiple sets of preconfigured parameter adjustments correspond to moderate or high user sensory sensitivities and the selected parameter adjustment set of moderate or high, is applied to multiple applications and wherein each application translates adjustments in the selected parameter adjustment set to the application specific adjustments in each application.

16. The device of example 15, wherein applying the selected parameter adjustment set of "Moderate" or "High" comprises adjusting a toolbar pane to a single line ribbon pane and pinning a navigation pane, removing the message preview, widening the message list, pausing animated gifs and disabling the people pane, to-do bar pane, sound reminders, sound message arrival alerts, desktop alerts for messages to the application, and buttons of switching between ribbon panes to disable buttons of minimizing or maximizing and navigation pane of the application.

17. The device of any of examples 15-16, wherein applying the selected parameter adjustment set of "Moderate" or "High" comprises adding sliding scale control for sensory adjustment, a light option to the reading pane to show the sensory adjustments parameters applied to the application and increasing size of the ribbon and icons and labels to the application.

18. A system includes a processor and a memory device coupled to the processor and having a program stored thereon for execution by the processor to perform operations. The operations include detecting sensory parameter adjustments to one or more applications, counting the detected sensory parameter adjustments, comparing the number of counted sensory parameter adjustments to a threshold number of sensory parameter adjustments, prompting a user to select a parameter adjustment set from multiple sets of preconfigured sensory parameter adjustments, in response to the number of counted sensory parameter adjustments exceeding the threshold number, receiving the selected parameter adjustment set, and applying the selected parameter adjustment set to at least one of the one or more applications.

19. The system of example 18, wherein the threshold number of sensory parameter adjustments is two, the multiple sets of preconfigured parameter adjustments correspond to moderate or high user sensory sensitivities and wherein the selected parameter adjustment set is applied to multiple applications by prompting the user to apply the selected parameter adjustment set to one or more applications.

20. The system of example 19, wherein applying the selected parameter adjustment set of "Moderate" or "High" comprises adjusting a toolbar pane to a single line ribbon pane and pinning a navigation pane, removing the message preview, widening the message list, pausing animated gifs, disabling the people pane, to-do bar pane, sound reminders, sound message arrival alerts, desktop alerts for messages to the application, and buttons of switching between ribbon panes to disable buttons of minimizing or maximizing and navigation pane of the application, and adding sliding scale control for sensory adjustment, a light option to the reading pane to show the sensory adjustments parameters applied to the application, and increasing size of the ribbon and icons and labels to the application.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method of efficiently modifying application user interfaces comprising:
　detecting sensory parameter adjustments to one or more applications;
　counting the detected sensory parameter adjustments;
　comparing the number of counted sensory parameter adjustments to a threshold number of sensory parameter adjustments;
　prompting a user to select a parameter adjustment set from multiple sets of preconfigured sensory parameter adjustments, in response to the number of counted sensory parameter adjustments exceeding the threshold number;
　receiving the selected parameter adjustment set; and
　modifying at least one of the one or more applications using the selected parameter adjustment set to change a user interface of each of multiple applications, wherein the multiple sets of preconfigured sensory parameter adjustments are expressed in a canonical form, wherein each application translates adjustments in the selected parameter adjustment set to application specific adjustments using a canonical table of sensory parameter adjustments, and wherein each application is modified by the application specific adjustments in each application.

2. The method of claim 1, wherein the threshold number of sensory parameter adjustments is two.

3. The method of claim 1, wherein the multiple sets of preconfigured parameter adjustments correspond to moderate or high user sensory sensitivities.

4. The method of claim 3, wherein modifying the multiple applications by the selected parameter adjustment set of "Moderate" comprises adjusting a toolbar pane to a single line ribbon pane and pinning a navigation pane to the applications.

5. The method of claim 3, wherein modifying the multiple applications by the selected parameter adjustment set of "High" comprises adjusting a toolbar pane to disable buttons of switching between ribbon panes and to disable buttons of minimizing or maximizing a navigation pane of the applications.

6. The method of claim 3, wherein modifying the multiple applications application by the selected parameter adjustment set of "Moderate" or "High" comprises adjusting a toolbar pane to remove a message preview, widening a message list, pausing animated gifs, disabling people pane, and disabling a to-do bar pane to the applications.

7. The method of claim 3, wherein modifying the multiple applications application by the selected parameter adjustment set of "Moderate" or "High" comprises disabling sound reminders, sound message arrival alerts, and desktop alerts for messages to the applications.

8. The method of claim 3, wherein modifying the multiple applications by the selected parameter adjustment set of "Moderate" or "High" comprises adding a light option to a reading pane to show the sensory adjustments parameters applied to the applications.

9. The method of claim 3, wherein modifying the multiple applications application by the selected parameter adjustment set of "Moderate" or "High" comprises adding sliding scale control for sensory adjustment applied to the applications.

10. The method of claim 3, wherein modifying the multiple applications application by the selected parameter adjustment set of "Moderate" or "High" comprises increasing size of a ribbon and icons and labels to the applications.

11. The method of claim 1, and further comprising:
　prompting the user to use the selected parameter adjustment set to modify an additional application;
　receiving a user input indicating a further application to modify using the selected parameter adjustment set; and
　modifying the further application using the selected parameter adjustment.

12. A computer readable storage device having instructions stored thereon for causing a computer to modify application user interfaces by performing operations comprising:
　detecting sensory parameter adjustments to one or more applications;
　counting the detected sensory parameter adjustments;
　comparing the number of counted sensory parameter adjustments to a threshold number of sensory parameter adjustments;
　prompting a user to select a parameter adjustment set from multiple sets of preconfigured sensory parameter adjustments, in response to the number of counted sensory parameter adjustments exceeding the threshold number;
　receiving the selected parameter adjustment set; and
　modifying at least one of the one or more applications using the selected parameter adjustment set to change a user interface of each of multiple applications, wherein the multiple sets of preconfigured sensory parameter adjustments are expressed in a canonical form, wherein each application translates adjustments in the selected parameter adjustment set to application specific adjustments using a canonical table of sensory parameter adjustments, and wherein each application is modified by the application specific adjustments in each application.

13. The device of claim 12, wherein the threshold number of sensory parameter adjustments is two and the multiple sets of preconfigured parameter adjustments correspond to moderate or high user sensory sensitivities.

14. The device of claim 13, wherein modifying the multiple application by the selected parameter adjustment set of "Moderate" or "High" comprises adjusting a toolbar pane to a single line ribbon pane and pinning a navigation pane, removing a message preview, widening a message list, pausing animated gifs and disabling a people pane, to-do bar pane, sound reminders, sound message arrival alerts, desktop alerts for messages to the applications, and buttons of switching between ribbon panes to disable buttons of minimizing or maximizing a navigation pane of the applications.

15. The device of claim 13, wherein modifying the at least one application by the selected parameter adjustment set of "Moderate" or "High" comprises adding sliding scale control for sensory adjustment, a light option to a reading pane to show the sensory adjustments parameters applied to the one or more applications and increasing size of a ribbon and icons and labels to the applications.

16. A system comprising:
a processor; and
a memory device coupled to the processor and having a program stored thereon for execution by the processor to of modifying application user interfaces by performing operations comprising:
detecting sensory parameter adjustments to one or more applications;
counting the detected sensory parameter adjustments;
comparing the number of counted sensory parameter adjustments to a threshold number of sensory parameter adjustments;
prompting a user to select a parameter adjustment set from multiple sets of preconfigured sensory parameter adjustments, in response to the number of counted sensory parameter adjustments exceeding the threshold number;
receiving the selected parameter adjustment set; and
modifying at least one of the one or more applications using the selected parameter adjustment set to change an interface of each of multiple applications, wherein the multiple sets of preconfigured sensory parameter adjustments are expressed in a canonical form, wherein each application translates adjustments in the selected parameter adjustment set to application specific adjustments using a canonical table of sensory parameter adjustments, and wherein each application is modified by the application specific adjustments in each application.

17. The system of claim 16, wherein the threshold number of sensory parameter adjustments is two, the multiple sets of preconfigured parameter adjustments correspond to moderate or high user sensory sensitivities.

18. The system of claim 17, wherein modifying the at least one application by the selected parameter adjustment set of "Moderate" or "High" comprises adjusting a toolbar pane to a single line ribbon pane and pinning a navigation pane, removing a message preview, widening a message list, pausing animated gifs, disabling a people pane, to-do bar pane, sound reminders, sound message arrival alerts, desktop alerts for messages to the applications, and buttons of switching between ribbon panes to disable buttons of minimizing or maximizing a navigation pane of the one or more applications, and adding sliding scale control for sensory adjustment, a light option to a reading pane to show the sensory adjustments parameters applied to the applications, and increasing size of the ribbon and icons and labels to the applications.

* * * * *